United States Patent [19]

Caddick et al.

[11] Patent Number: 4,463,426
[45] Date of Patent: Jul. 31, 1984

[54] AUTOMATIC POSITION CONTROL FOR A VEHICLE SEAT

[75] Inventors: Gary R. Caddick, Lake Orion; Philip Q. Guest, Jr., Birmingham, both of Mich.

[73] Assignee: International Telephone and Telegraph Corporation, New York, N.Y.

[21] Appl. No.: 84,108

[22] Filed: Oct. 12, 1979

[51] Int. Cl.³ .................. G06F 15/20; B60N 1/02
[52] U.S. Cl. ......................... 364/424; 296/65 R; 318/466
[58] Field of Search .......... 364/424, 425; 296/65 R; 297/346; 318/466, 467; 248/394, 396; 200/1 R, 153 R, 153 A, 153 L, 153 P

[56] References Cited

U.S. PATENT DOCUMENTS

| | | | |
|---|---|---|---|
| 3,105,668 | 10/1963 | Pickles et al. | 248/394 |
| 3,135,492 | 6/1964 | Steere et al. | 248/394 |
| 3,183,314 | 5/1965 | Pickles | 248/394 |
| 3,597,554 | 8/1971 | Siegal | 318/466 |
| 3,626,130 | 12/1971 | Siegal | 318/466 |
| 3,906,207 | 9/1975 | Rivere et al. | 364/425 |
| 4,015,812 | 4/1977 | Heesch | 248/394 |
| 4,158,160 | 6/1979 | Meiller | 318/467 |
| 4,204,255 | 5/1980 | Cremer | 364/425 |

*Primary Examiner*—Errol A. Krass
*Attorney, Agent, or Firm*—James B. Raden; Marvin M. Chaban

[57] ABSTRACT

A seat position control device for a powered or automatic seat adjusting mechanism for motor vehicles. The motor drives for the various adjustments uses a motor with a predetermined number of poles. Thus, for each revolution of a motor, a predetermined number of pulses is generated. By counting these pulses relative to a reference, the position of the seat can be determined. Within memory, a desired location setting may be registered to return the seat to that setting when desired. A commercially available microprocessor or suitable electronic components may be used as the logic and memory medium.

3 Claims, 20 Drawing Figures

AUTOMATIC POSITION CONTROL FOR A VEHICLE SEAT

BACKGROUND OF THE INVENTION

Automatic or powered tracks for seats of vehicles is well-known from many U.S. patents such as U.S. Pat. Nos. 4,015,812 issued Apr. 5, 1977 and 3,951,004 issued Apr. 20, 1976 both to M. O. Heesch. In these patents is shown a seat track mechanism in which three separate motors or motor armatures are used for the respective motor drives, i.e., horizontal or fore and aft, vertical, front end and vertical rear end. Each such motor operates a mechanical drive for adjusting the seat position in response to the manual operation of a motor controlling switch. In such systems, a pair of switches may be provided for each motor, one switch of the pair for each direction of seat travel. One or more switches are actuated and held actuated until the seat has reached a desired position.

With these powered adjustments, an interest arose in setting a position and retaining a memory of that position so that the seat would return to that position automatically on actuation of one or more switches. In certain of the developments in this field, the door position and return was tied to the door opening and closing. The mechanisms employed included cam-operated memory devices such as shown in U.S. Pat. Nos. 2,827,105 issued Mar. 18, 1958; 3,183,314 issued May 11, 1965 and 3,626,130 issued Sept. 11, 1970.

In patents of the type shown, cams or gears are positioned at a desired setting and declutched from the motor drive. The seat can then be positioned free of the setting. If the seat is to be repositioned at the setting represented by the cam, the cam is coupled to the motor by a clutch to stop the motor travel at the desired setting.

SUMMARY OF THE INVENTION

The present invention is directed to an electronic memory and control for automatic adjustment of a power seat track.

The memory and logic are contained within a microcomputer, and other commercially available electronics.

The basic principle of the invention resides in the use of separate motors for the three drives, the motors being selected to have a fixed number of poles, five pole motors having been selected for use.

For each revolution of a motor, ten signals are produced, one from each end of a pole passed during the revolution. A current transformer is used in series with the power leads of the motor to couple the signals produced by the poles to the electronics. The electronics shape the pole signals so that they can be counted to define seat positions relative to a reference location.

For each motor there is provided three memories, one acting as a present position indicator and the remaining two as set position memories. The present position counter has at least twice as many memory locations as the maximum number of pulses representing the full travel path of a motor. Thus, the original position of the counter need not be calibrated, the counter being set to its mid or center position on power-up of the system. From the central point, the counter may traverse the full motor travel in pulses in either direction.

It is therefore an object of the invention to provide a new and improved memory and position control apparatus for a powered seat mechanism for a vehicle.

It is a further object of the invention to provide an electronic control for an adjustable seat track positioning mechanism.

It is a still further object of the invention to provide a powered seat track mechanism in which the revolutions made by the drive motors are counted and a memory of the counts maintained relative to an arbitrary starting position for controlling the movement of the seat to one of two separate settings, each setting being one of an almost infinite number of possible settings.

It is still another object of the invention to provide an automatic motor stall protection into the seat control of a powered seat track mechanism.

DETAILED DESCRIPTION OF THE DRAWINGS

Figure 1:
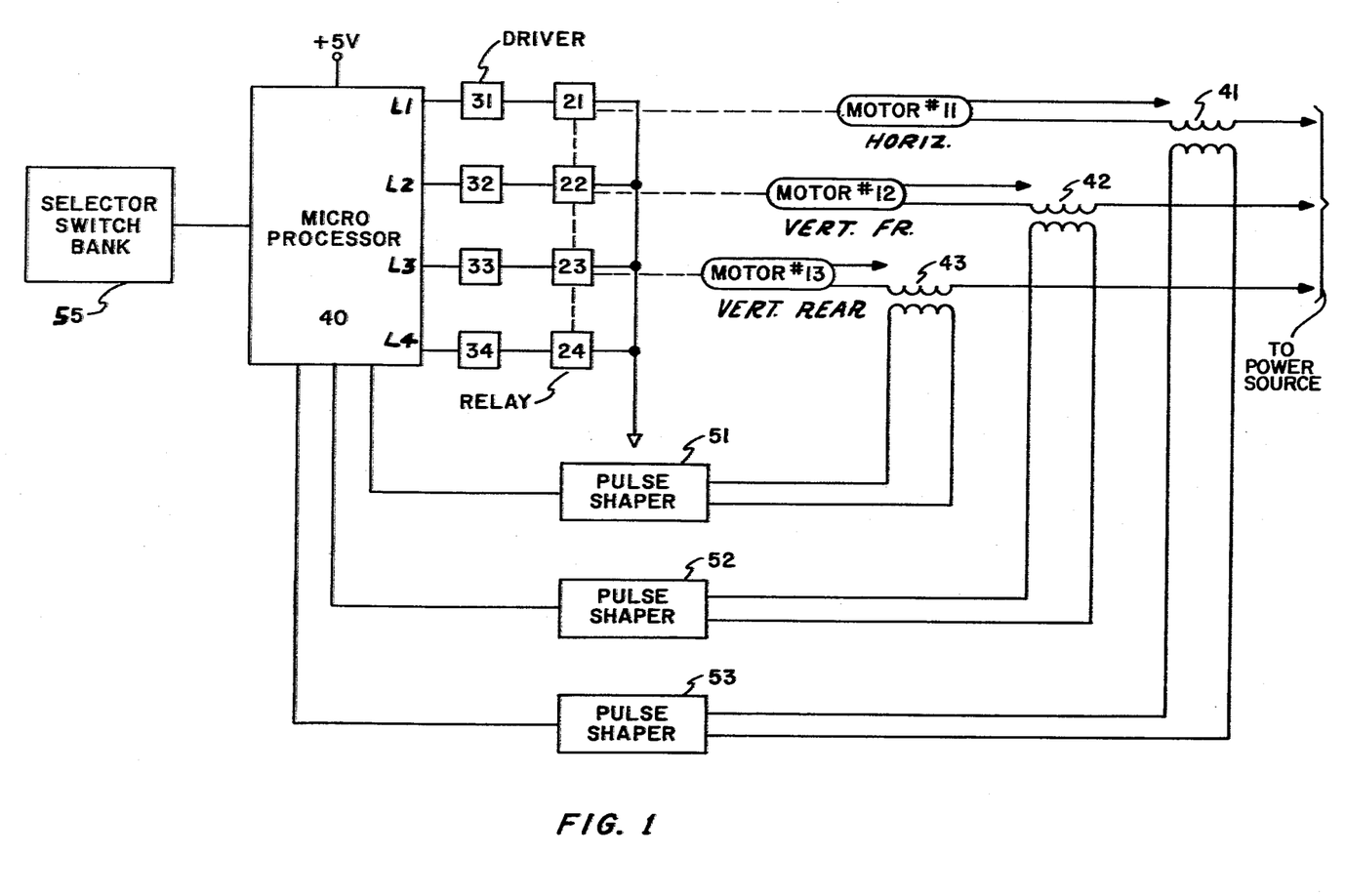
FIG. 1 is a schematic block diagram of the circuit for the system employing our invention.

In the block diagram of FIG. 1, we show three motors 11, 12 and 13 labeled horizontal, vertical front and vertical rear. These motors may be housed in a single casing as shown by U.S. Pat. No. 3,437,303 issued to J. Pickles on Apr. 8, 1969, or may be separated into individual housings. The motors are of conventional construction and are five pole, bidirectional, permanent magnet motors. As is well-known (not shown herein), each motor through suitable mechanical linkage operates one drive of the seat adjustment mechanism.

For each motor drive there is a relay, relay 21 for motor 11, relay 22 for motor 12 and relay 23 for motor 13. In addition, there is a fourth relay 24 which controls the direction of energization of the motors. For each relay 21–24, there is a driver 31–34 respectively, which responds to the output signals L1–L4 from the microcomputer 40 to operate the respective relays.

The microcomputer or controller 40 is a four-bit device which may be that one sold by Motorola, Inc. under the device number MC141200. Inputs to the controller are received from the motor current transformer phase shapers and from the selection switches of selector switch bank 55 to produce outputs to the relay drivers.

Each current transformer responds to the current variations caused by the rotation of the motor with which it is associated. For each revolution of a motor, the motor being a five pole one, ten current fluctuations or signals are generated in sequence. These signals are detected and shaped by the pulse shapers 51-53. These pulses are received, acknowledged and stored in the controller as will be explained.

Figures 2, 2B:
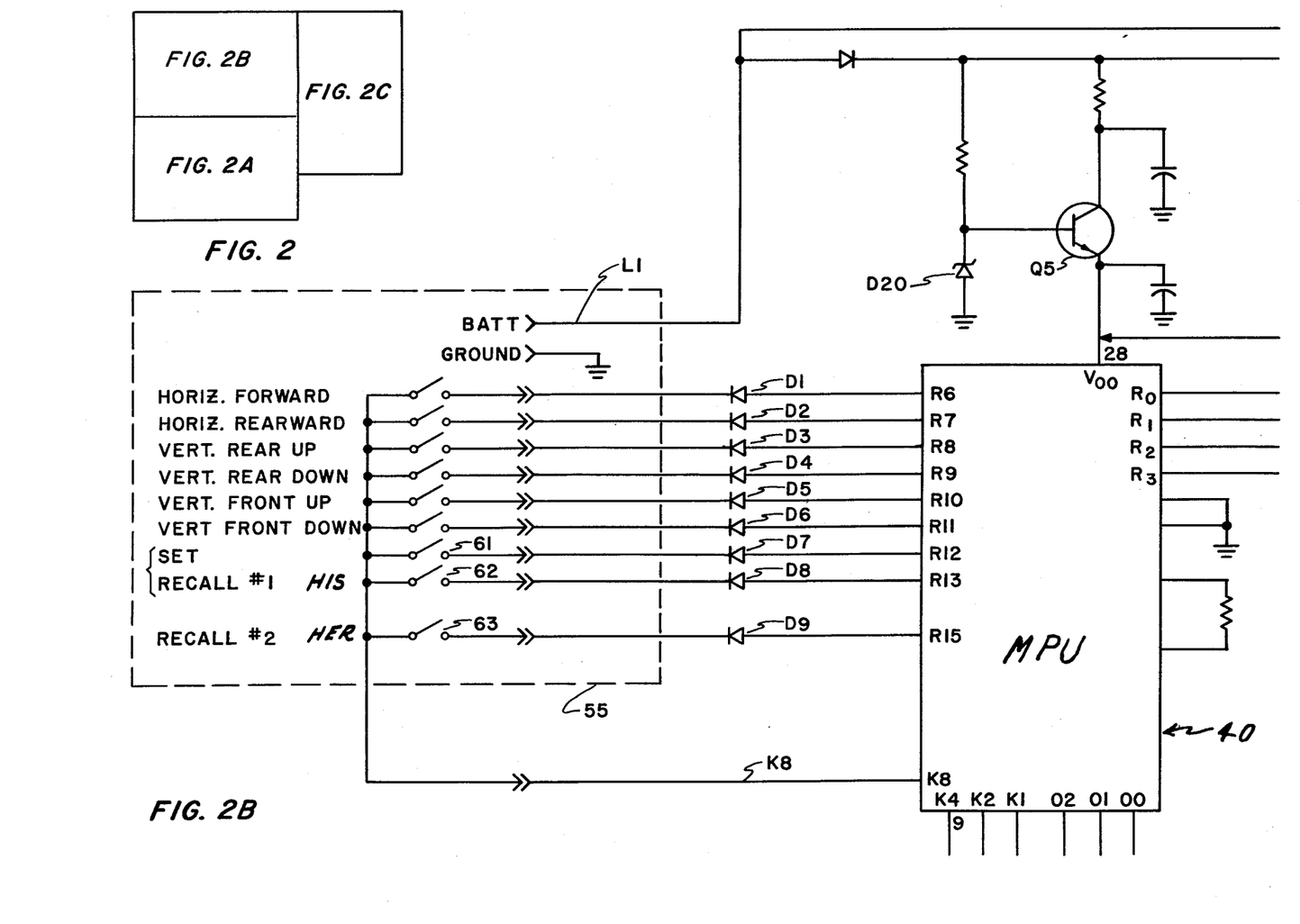
FIG. 2 is a block showing the arrangement of FIGS. 2A–2C to comprise a schematic circuit drawing showing details of the block diagram of FIG. 1.

Also providing input to the controller is the selector switch bank 55 shown as a block in FIG. 1 but shown in greater detail in the circuit of FIG. 2B joined as shown in FIG. 2.

In the circuit of FIG. 2B, there are shown nine normally open, single pole, single throw, momentary contact switches comprising the selector switch bank 55. Each switch is commonly connected to the return lead which connects the K8 input of the controller. The switches include two horizontal switches, one forward, the other rearward; two vertical rear switches, one up, the other down; two vertical front switches, one up and the other down; a set switch 61, a recall his' switch 62, and a recall her's switch 63. Each switch has a path which may be traced through an isolation diode D1–D9 to a common input lead to the controller or microprocessor (MPU) 40. The isolation diodes D1–D9 allow detection of simultaneous multiple switch actuation. There are nine output switch enable leads R6–R13 and R15 and the common input check lead K8. The controller activates each output R6–R13 and R15 individually and checks the K8 input for an indication of the activation of the switch associated with the R output activated at that instant.

The seat movement is accounted for by the controller through pulse signal inputs derived from three current transformers 41-43 (FIG. 2A), one associated with each motor. As a motor rotates, the current transformer senses a signal associated with the current variations caused by motor commutation. The secondary of the transformer such as 42 is coupled to the inputs of a comparator 66 through like resistors 67 and 68. The secondary of the transformer 42 also has a capacitor 70 across the leads to provide high frequency cancellation. The rectangular wave output from the comparator is passed through a differentiator or falling edge detection circuit comprised of capacitor 72 and associated components. The components, including capacitor 72, gate 74 and associated components taken as a whole, act to shorten the pulse width and provide pulse shaping in a manner appropriate for the SET input of the pulse latch 80. This pulse compression reduces the chance of the SET input and RESET input from the controller 40 occuring simultaneously. When the controller 40 senses the latch or flip-flop 80 set, the pulse will be internally counted and an acknowledge or reset pulse is sent from controller output O2, which resets latch 80.

Figure 2A:
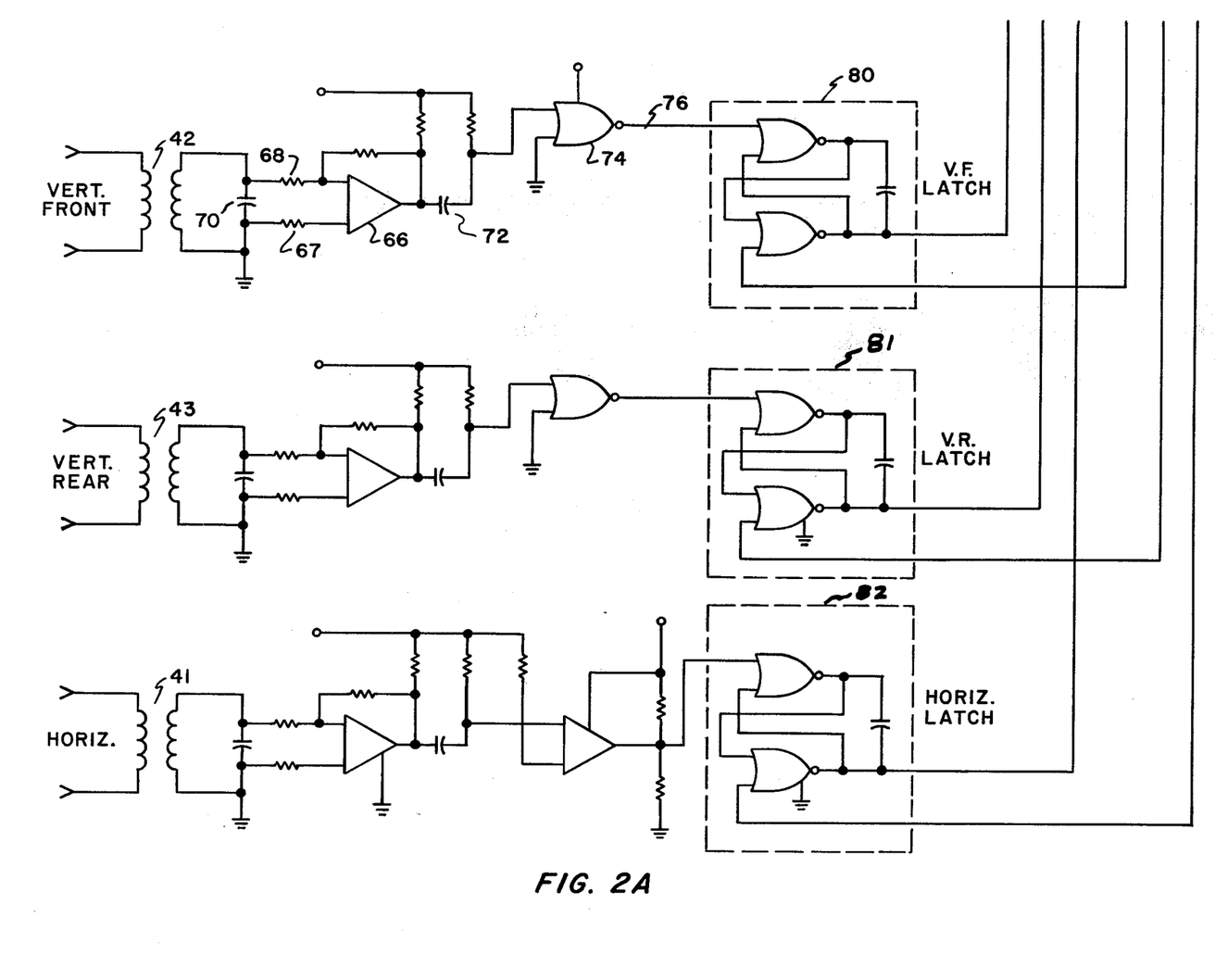

Thus, there are three pulse inputs to the controller, horizontal on input K1, vertical rear on input K2 and vertical front on input K4. Associated with each of these inputs is a reset or acknowledge output from the controller, O0, O1 and O2, connected to the RESETS of latches 80, 81 and 82 respectively.

For the microcomputer and the pulse input circuits, there is a five volt D.C. source derived from the 12 volt battery input from the vehicle supplied on lead L1 (FIG. 2B). The input is regulated by the zener diode D20 and through transistor Q5 to provide the supply voltage to the microcomputer and pulse shaping circuits. Once the system is coupled to the battery, the controller is powered up and remains in operation. Only in the event of disconnection from the battery source is the controller shut off, in which case, the stored data within the volatile memories of the controller are lost.

Figure 2C:
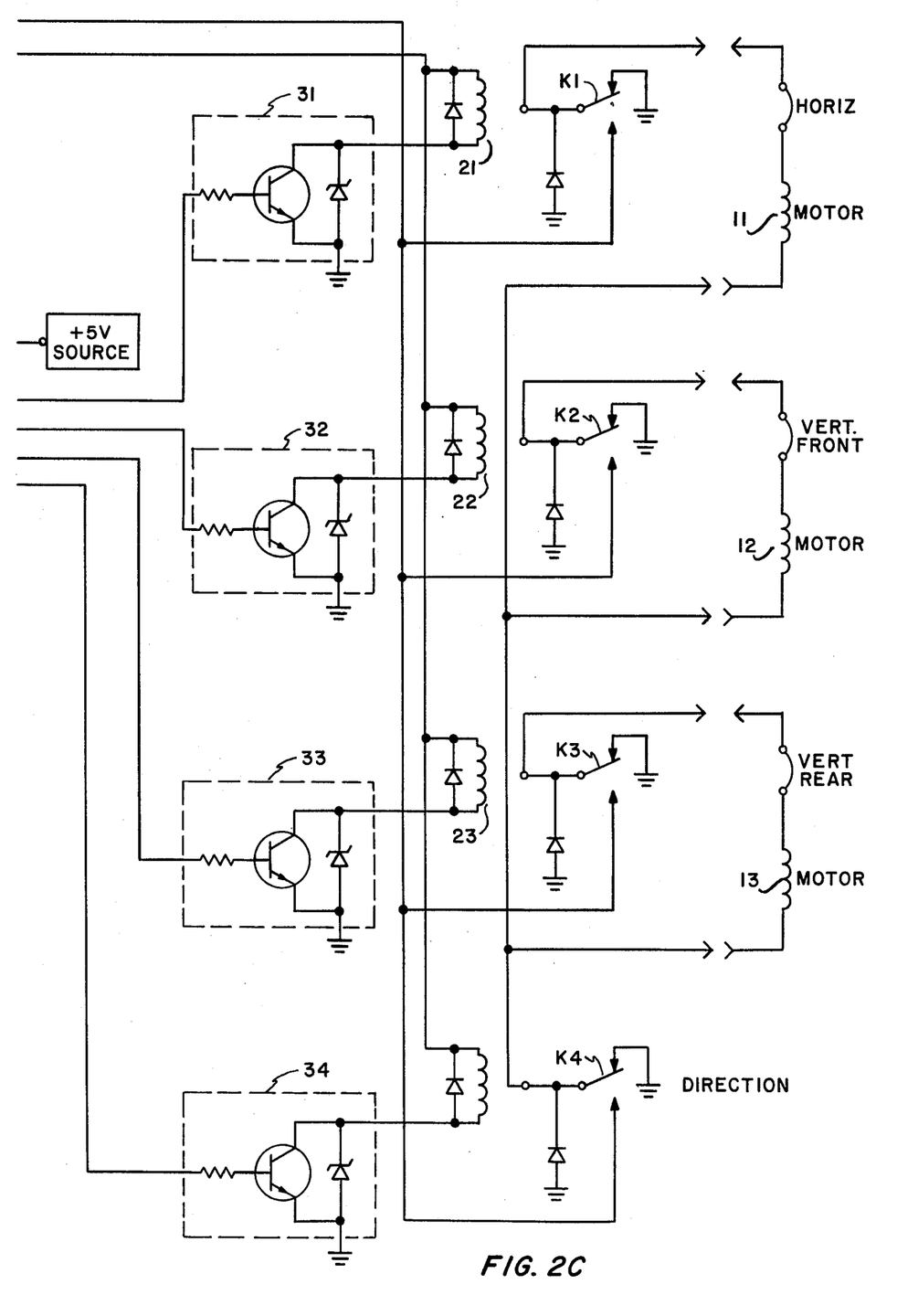

The output section of the system comprises four transistor driver stages 31-34, each connected to its respective relay 21-23 (FIG. 2C). Three of the relay coils 21-23 control contacts K1-K3 for operation of the respective motors. The fourth relay 34 controls the direction of operation of the three motors. With relay 34 unenergized, and contacts K4 in the normal position as shown in FIG. 2C, ground is connected to the lower end of the winding of each motor. This ground will energize each motor enabled by the activation of the upward or forward switches of switch bank 55 (FIG. 1), in the forward or upward direction. With a motor relay 31-33 energized, 12 volt battery is supplied to the top winding of the respective motor winding to enable the motor or motors in the forward or upward direction. With relay K4 energized, 12 volt battery is supplied to the lower motor winding allowing the motor or motors to be operated in the backward or downward direction when the respective relay 31, 32 or 33 is de-energized. All motors, 11, 12 and 13, will be off either when the four relays 21-24 are de-energized or when the four relays are all energized.

Figure 3:
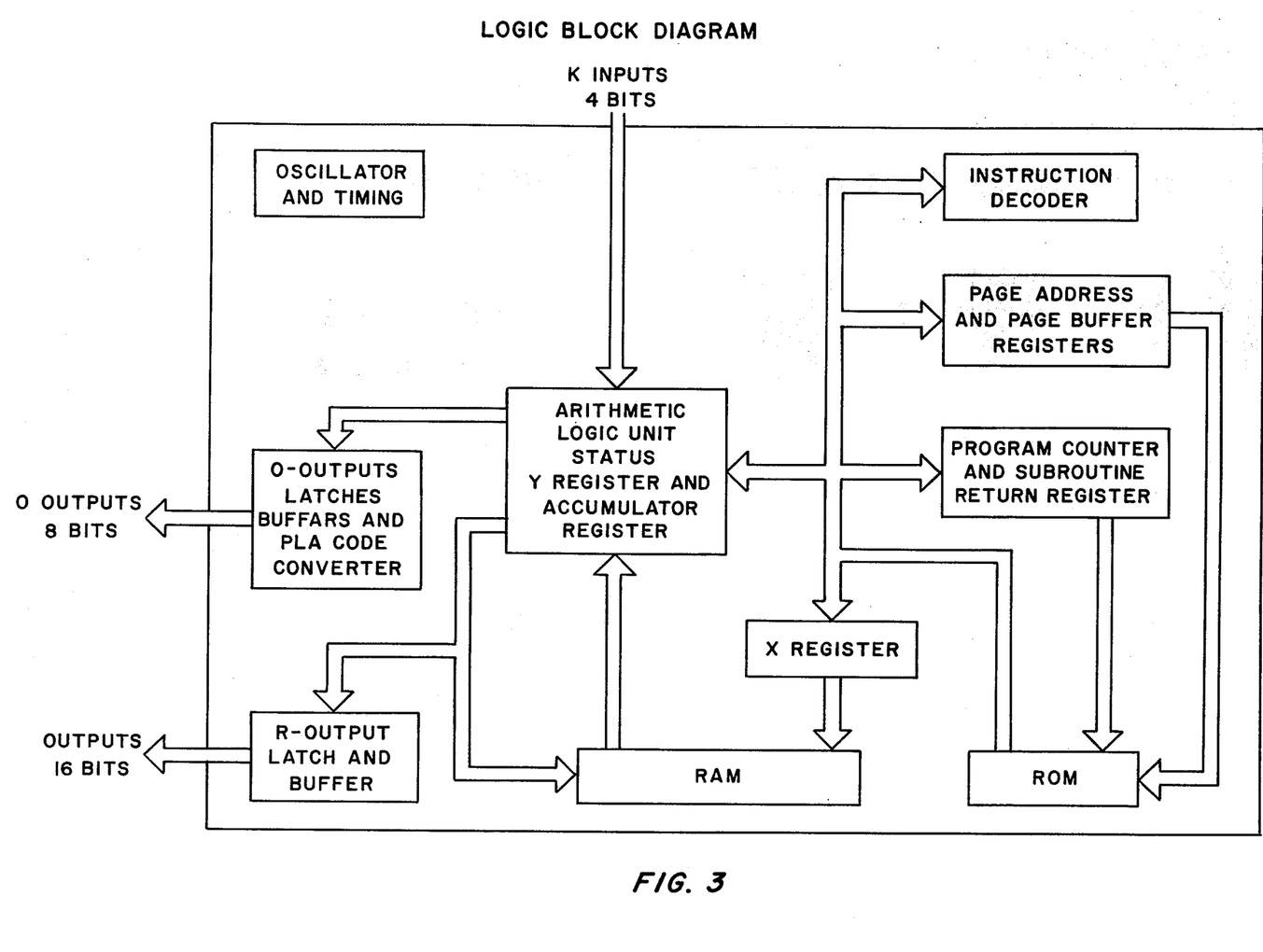
FIG. 3 is a schematic logic block diagram of the microprocessor described herein.

In FIG. 3, we show the manufacturers functional block diagram of a single chip microcomputer, type MC141200, which may be used as the controller.

Within the microcomputer, there is a read only memory which retains the program for controlling data input, storage, processing and output. Data which is input on the K inputs from the motor rotation pulse detection circuits and from the switches flow to the logic unit for processing. These inputs enter the logic unit and cause modifications to the program execution sequence eventualizing a logical control of the outputs. The outputs O0-O2 act as acknowledge resets for the pulse latches. The R outputs are used to scan the function switches and also to enable the appropriate relay drivers and associated motor relays.

There are nine such switches multiplexed into one input (K8) with nine output multiplex enabling leads R6-R13 and R15. No more than one enabling output shall be activated at any particular instant. These switches can be divided into four functional groups:

A. Positioning Switches, Forward or Up (Three such switches)
B. Positioning Switches, Reverse Rearward or Down (Three such switches)
C. Recall Switches (Two switches)
D. Set Switch (One switch)

When the system is idle, the first function group switch to be activated is the group which takes precedence.

Within switch groups A. and B., the first switch depressed determines the group acted upon and the other switches within that group will be monitored and acted upon simultaneously. All other switches are ignored until all switches of the original direction group are released.

Within switch group C., the first switch depressed is the one acted upon while all other switches are ignored until the first switch is released.

Within switch group D., the controller is enabled for the setting of a particular memory (His or Hers). With the group D. switch being depressed and held, all other function groups can and will be acted upon.

When a switch in group C. is activated (Recall Switches), the controller computes the distance and direction to the desired position and enables the appropriate motors accordingly over output leads R0–R3. If recalling requires a motor or motors to go forward and other motors reverse, the motors are enabled in the forward direction first and then the reverse direction is enabled for the appropriate motor(s) once all the motors activated in the forward direction have reached their destination or have stalled.

A recall switch (group C.) depressed following activation of the set mode, causes the present seat position to be saved in the memory position (His or Hers) represented by that recall switch. If a positioning switch (group A. and B.) is depressed following the activation of the set mode, the set mode is deactivated.

If the controller detects that a motor has stalled due to reaching the end extreme of a particular direction or due to system failure, that motor direction will be disabled for further attempts of movement in that direction. To re-enable that direction, the controller must detect movement in the opposite direction.

Figure 4:
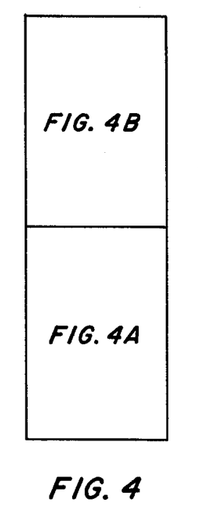
FIG. 4 is a block diagram providing the relative positions of FIGS. 4A and 4B to show the flow chart of the power up routing.

In the flow charts, FIG. 4 represents the program entry when power is applied to the system. This program entry is executed whenever the power is initially applied to the system. The system thereafter runs and cycles continuously as long as power is maintained. The system will remain running and operative for the life of the system. Whenever the power is removed and subsequently replaced, initialization will recur.

For each direction, horizontal, vertical rear and vertical front, there are four buffers or memories used within the controller. These include: the actual position buffer (POS), two memory buffers (HIS and HER) and a destination buffer (DEST) used for calculating the distance to destination.

Additional memories within the controller include various one bit memories or flags used for processing control. One group of flags referred to as flag 0, flag 1 and flag 2 are used as indicators for which motors are presently enabled to allow counting of rotation pulses for these motors only. Another grouping of flags indicates which motor directions have stalled in the past and should not be enabled. There are six of these flags; Hz stall forward, Hz stall backward, VR stall forward, VR stall backward, VF stall forward and VF stall backward. In addition, there are three other flags to control processing, the RCLMD flag indicates whether or not recall processing is taking place, the SETMD flag indicates whether the set switch has been activated and the HISRCL flag indicates which recall switch was last activated.

Figure 4A:
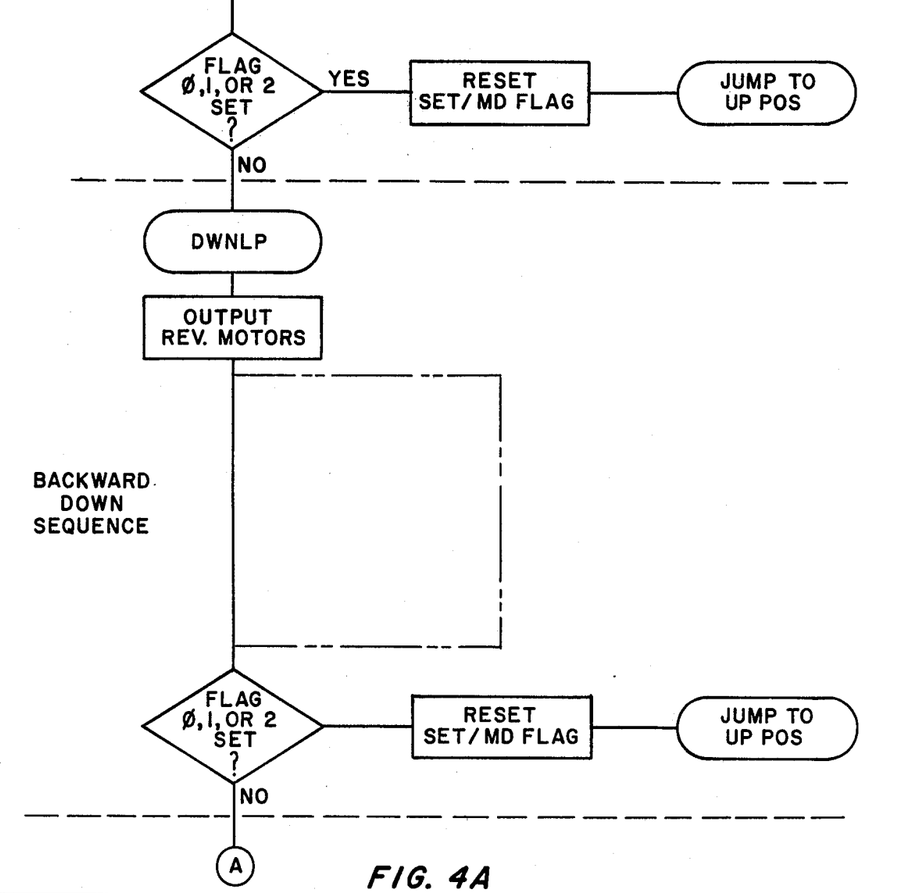
Figure 4B:
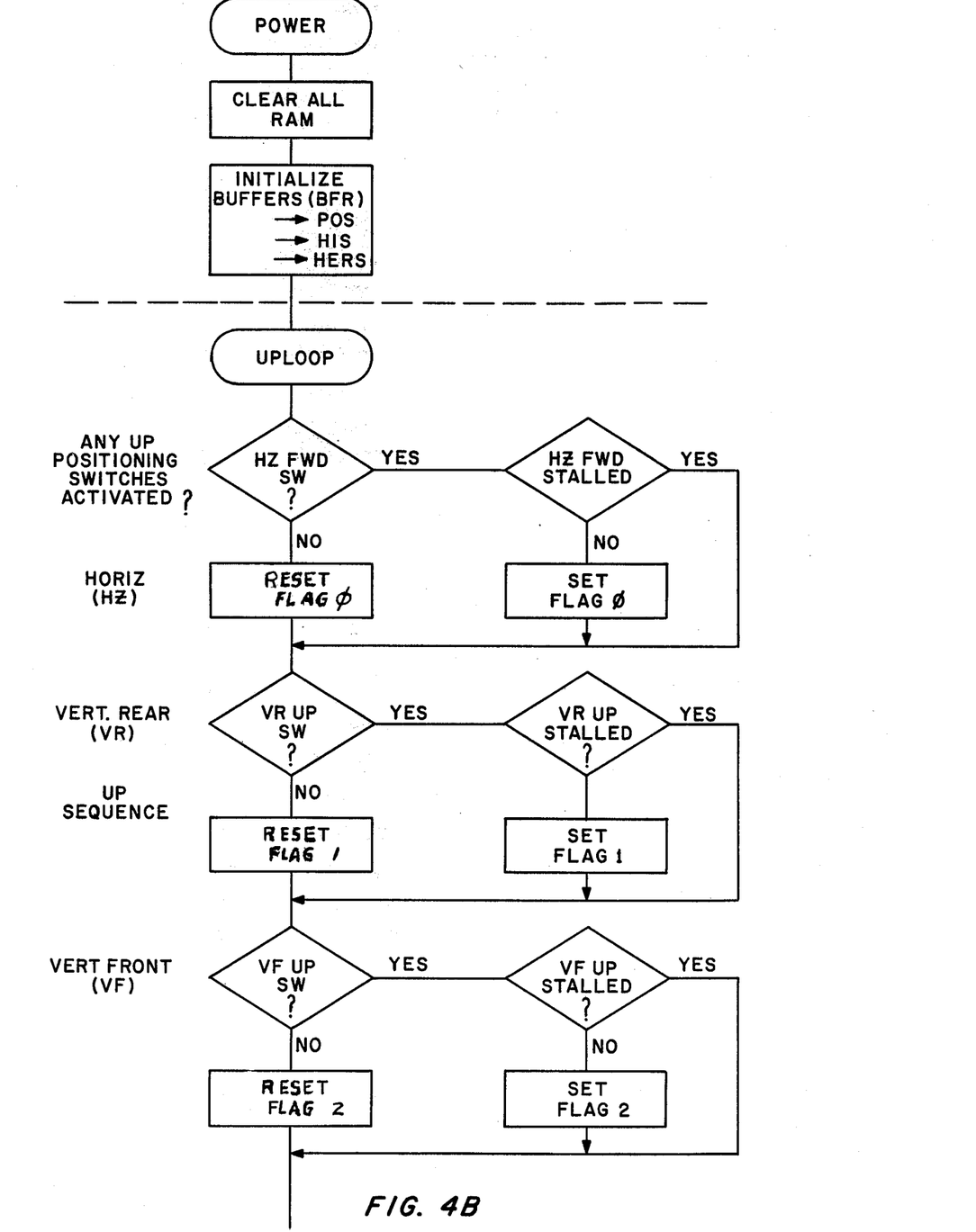

Viewing FIG. 4B, the first process occuring on a power-up condition is to clear all random access memory of spurious data. The position buffer and His' and Her's buffers or memories are then initialized to the numeric center position of the memories with disregard for the initial positions of the seat adjustment mechanism. Since the buffer memories have a capacity of more than double the number of possible motor positions, a full traverse of any motor drive is then possible without memory overflow.

Figures 5, 5A:
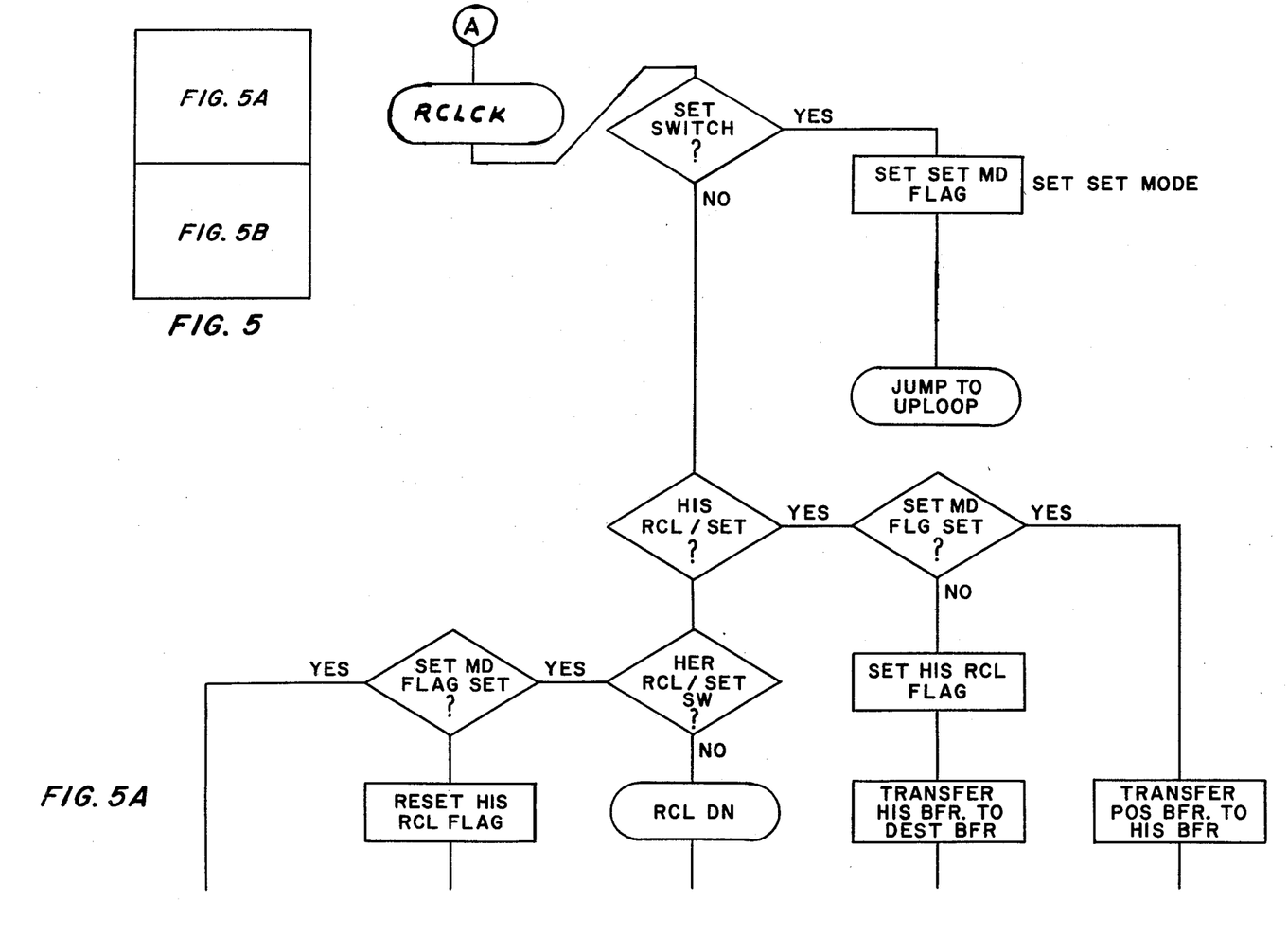
FIG. 5 is a block diagram providing the relative positions of FIGS. 5A and 5B to show the flow chart of the one scan sequence.
Figure 5B:
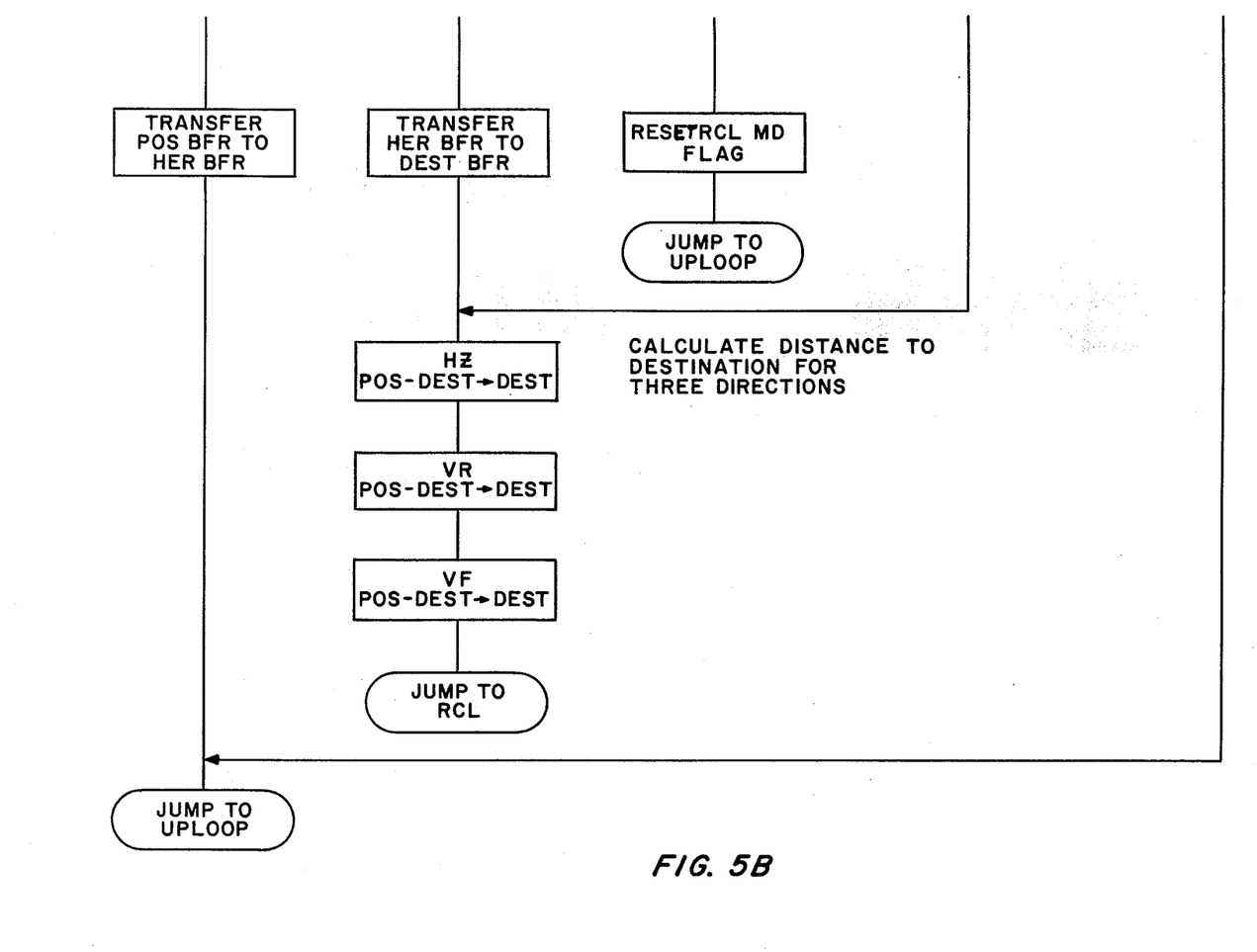

When the system is inactive (no switches activated), all nine switches are continuously scanned. This is accomplished as shown in the flow diagrams FIGS. 4B, 4A and 5A with the routines labeled UPLOOP, DWNLP and RCLCK. This program sequence is repeated until a switch is activated. When a switch is activated, the program sequence will change according to the function described by the activated switch.

If an up positioning switch is pressed, detection would be accomplished in the UPPOS routine as shown in FIG. 4B. The program will check the corresponding stall forward flag to determine if that particular direction may be enabled. Assuming that the stall flag is not set, the corresponding count enable flag (flag 0, flag 1 or flag 2) will be set.

Continuing, the other up direction switches are checked for activation and similarly, the appropriate count enable flags will be set, providing stall has not occured in these directions. Previous to entry into DWNLP (FIG. 4A), a check is made for any count enable flags being set.

With an up position switch having been pressed and the flag set, the program will then take the branch causing the SETMD flag to be reset (positioning switches diable the set mode as described previously) and flow proceeds to the UPPOS routine. The UPPOS routine handles the turning on and off of motors and the counting of pulses as allowed by the count enable flags.

Figure 7:
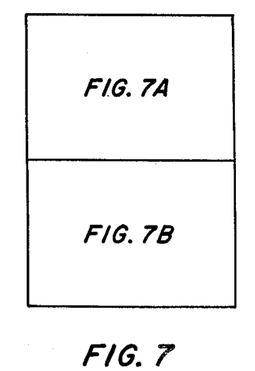
FIG. 7 is a block diagram providing the relative positions of FIGS. 7A and 7B to make up the UP movement routine.
Figure 7A:
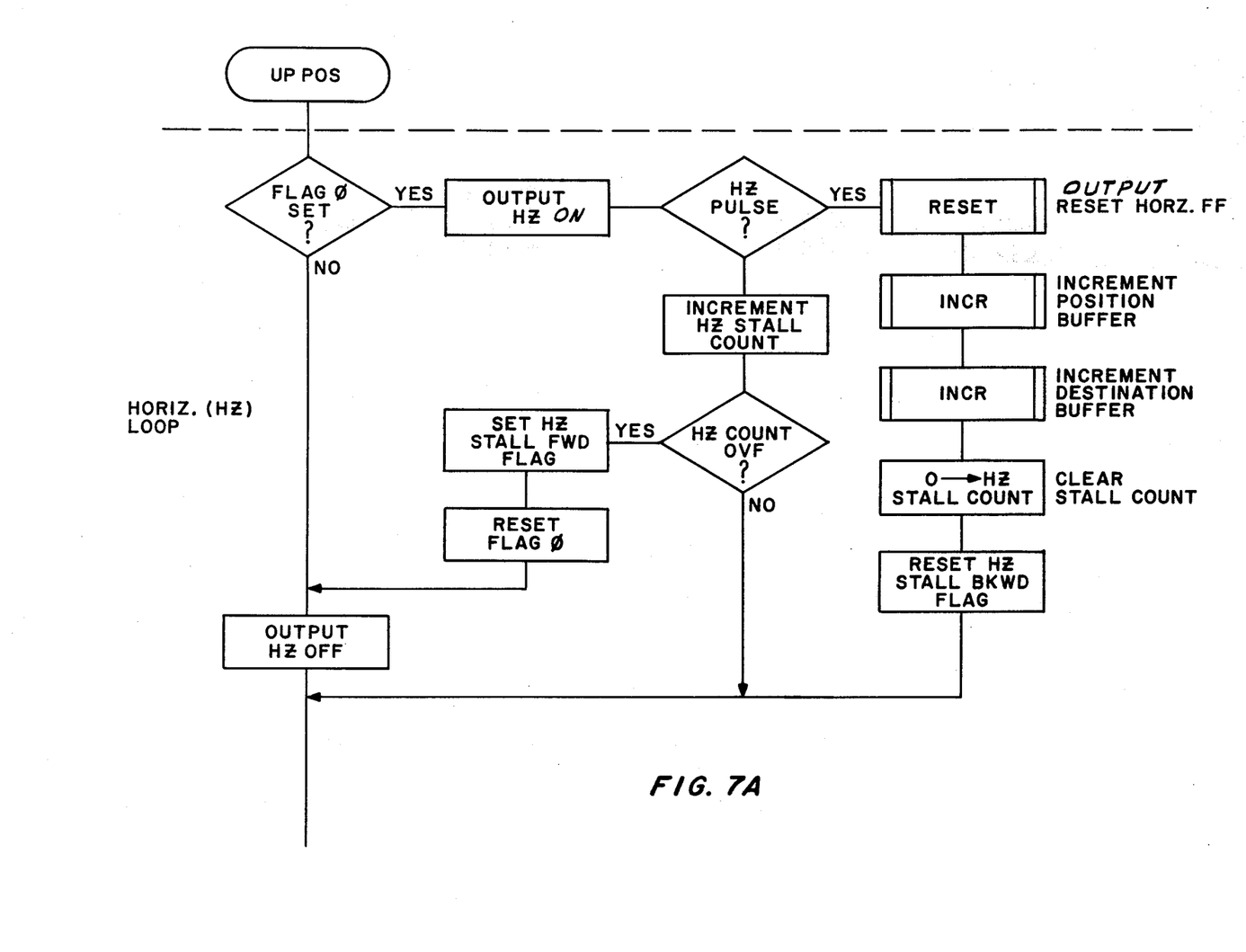

Inspection of FIG. 7A shows that a motor will be turned off or turned on directly, dependent upon the state of flag 0. With the flag set, and motor enabled, the pulse input is then inspected for a corresponding rotation pulse. If no pulse is present, the associated stall counter is incremented to keep track of the number of complete up positioning program loops made without a pulse being present. When this counter overflows, the forward stall flag will be set, the count enable flag will be reset and the motor will be turned off. This will happen after an approximate one-half second absence of rotation pulses.

Figure 7B:
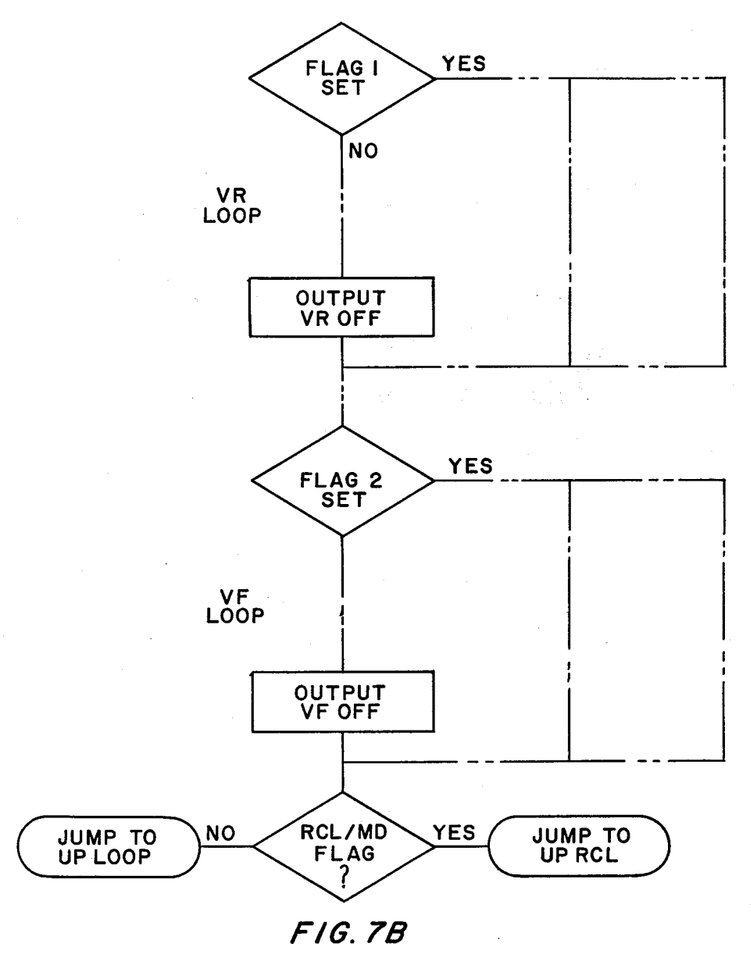

When a rotation pulse is sensed, the program outputs a pulse latch reset, increments the position memory by one count, increments the distance to destination memory by one count, zeros or resets the stall loop counter and will reset the opposite (reverse) stall flag if previously set. This described procedure is repeated for the other two directions as shown in FIG. 7B. The last check within the UPPOS routine is to check for the RCLMD flag being set. Since this routine is used for both positioning and recalling, this check is needed to determine which part of the program to return to, UPLOOP or UPRCL.

The cyclical sequence for up positioning, which include the routines UPLOOP and UPPOS, are repeated until all count enable flags are reset. This will occur after all up positioning switches are released and/or all up direction motors have stalled. At that time, program flow proceeds to the DWNLP routine where similar processing takes place upon inspection of the down positioning switches and motor rotation pulses.

When down positioning is complete, program flow proceeds to the RCLCK routine. This routine checks the remaining switches associated with memory setting and recalling. The action taken upon detection of the SET switch is to simply set the SETMD flag for future reference. If the SET switch is not activated, the two RECALL switches are inspected for activation. With one of these switches being activated, the program then checks the SETMD flag to determine what action to take.

If the SETMD flag is set, due to a previous activation of the SET switch, memory setting will be accomplished by transferring non-destructively, the contents of the present position memory to the appropriate memory, HIS or HER, depending upon which recall switch is activated. Otherwise, the indicated function is to accomplish a memory position recall, either his' or her's.

For future reference as to what type of recall is taking place, a HISRCL flag will be set if HIS RECALL switch is activated or reset if HER RECALL switch is activated. The routine then sets up for a distance-to-destination calculation by transferring, non-destructively, either the HIS or HER memory to the DEST memory. The program then subtracts this calculated number from the present position value and returns the result to the DEST memory. The DEST memory now reflects the number of pulses required to reach the destination for each direction, horizontal, vertical rear and vertical front.

Figure 6:
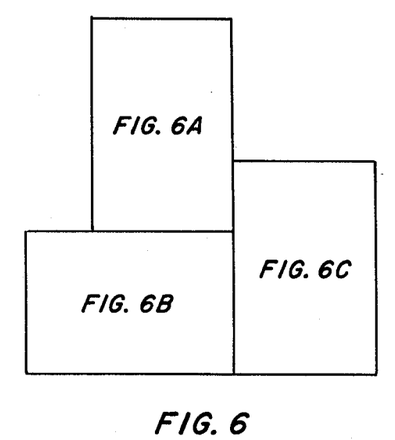
FIG. 6 is a block diagram providing the relative positions of FIGS. 6A, 6B and 6C to make up the recall routine.
Figure 6A:
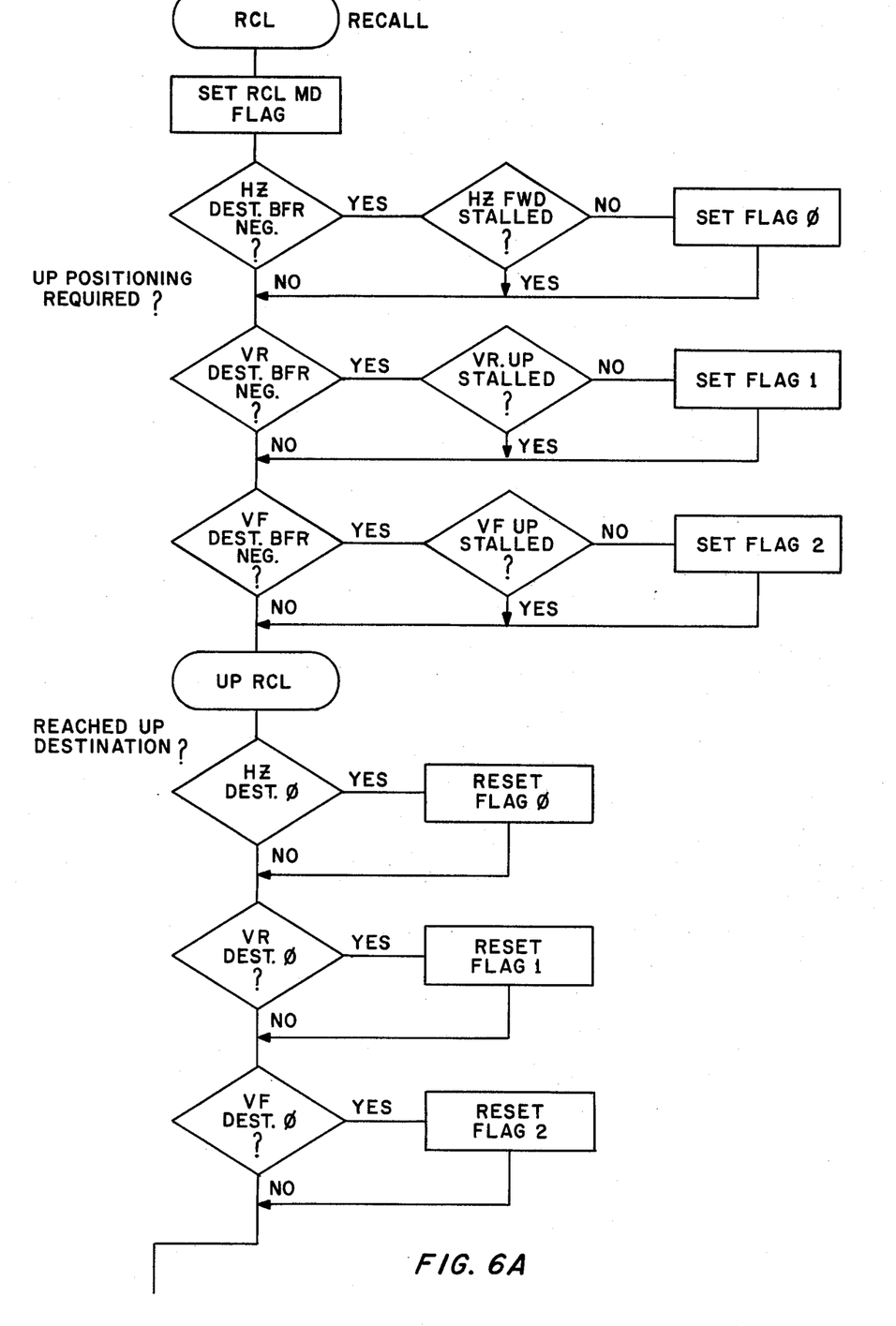
Figure 6B:
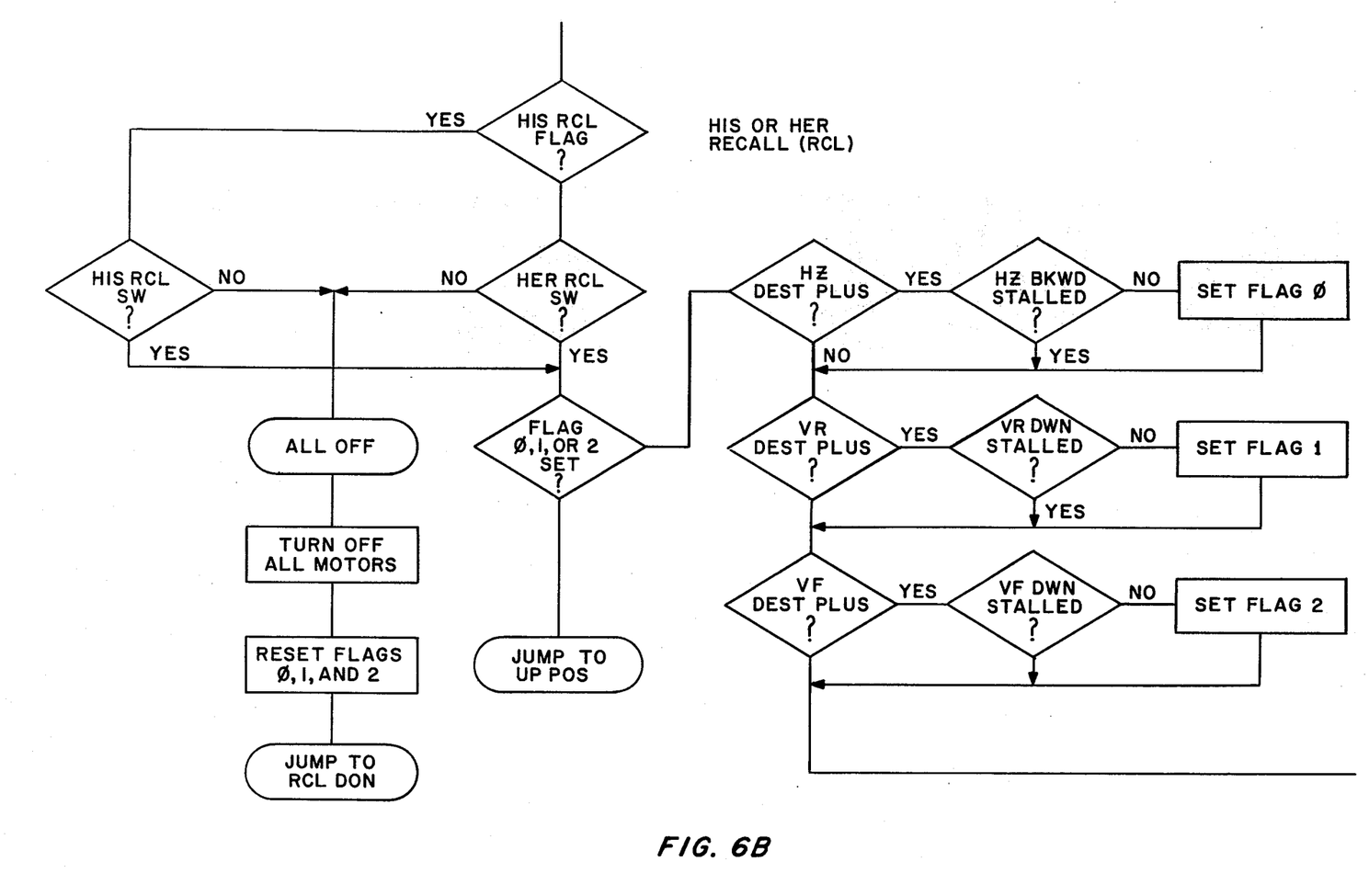

Proceeding to the RCL routine, the program sets the RCLMD flag and then inspects each DEST value for a negative quantity (FIG. 6A). If the value is negative, which indicates movement in the up or forward direction is necessary, a check for stall in that direction is made and the count enable flag is set appropriately. After the same procedure is repeated for the other two directions, the routine UPRCL is entered.

The UPRCL routine as shown in FIG. 6A inspects the DEST memories to determine when the destination has been reached. When that condition has been met, the associated count enable flag is reset.

The cyclical sequence for upward recalling passes repeatedly through the UPRCL routine and the UPPOS routine. As described previously, the UPRCL routine determines when a particular direction should stop movement, indicated by the reseting of the associated flag and the UPPOS routine does the actual output control of the motor and the counting of rotation pulses as well as the detection of motor stall. The last sequence within the UPRCL routine determines whether the recall switch, which initiated the recall, as indicated by the HISRCL flag, remains activated. This allows the system to terminate a recall operation by release of the recall switch. If it is determined that the switch has been released, the program proceeds to ALLOFF routine which shuts off all motors and resets flags to return the system to the inactive state.

Figure 6C:
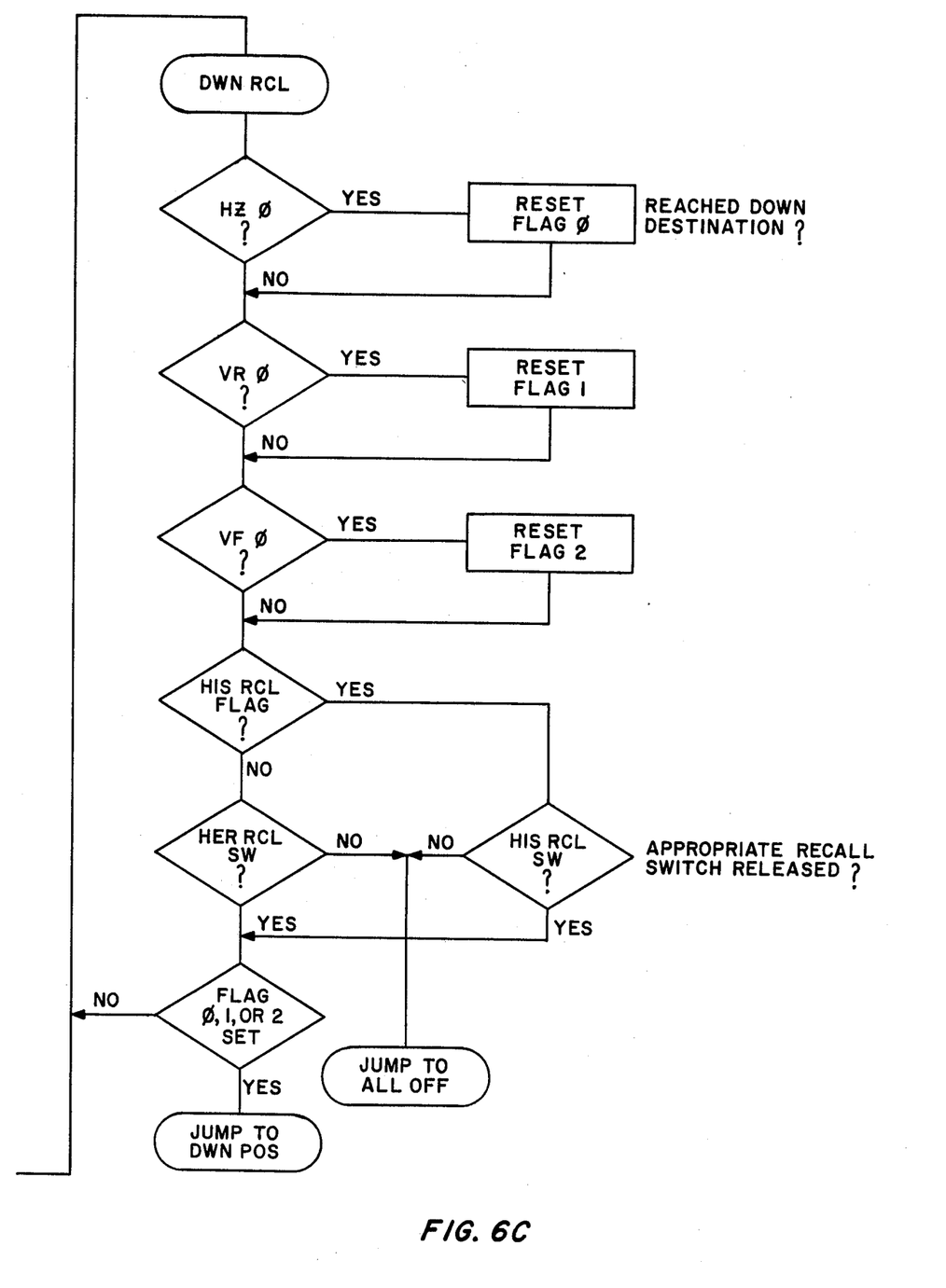
Figure 8:
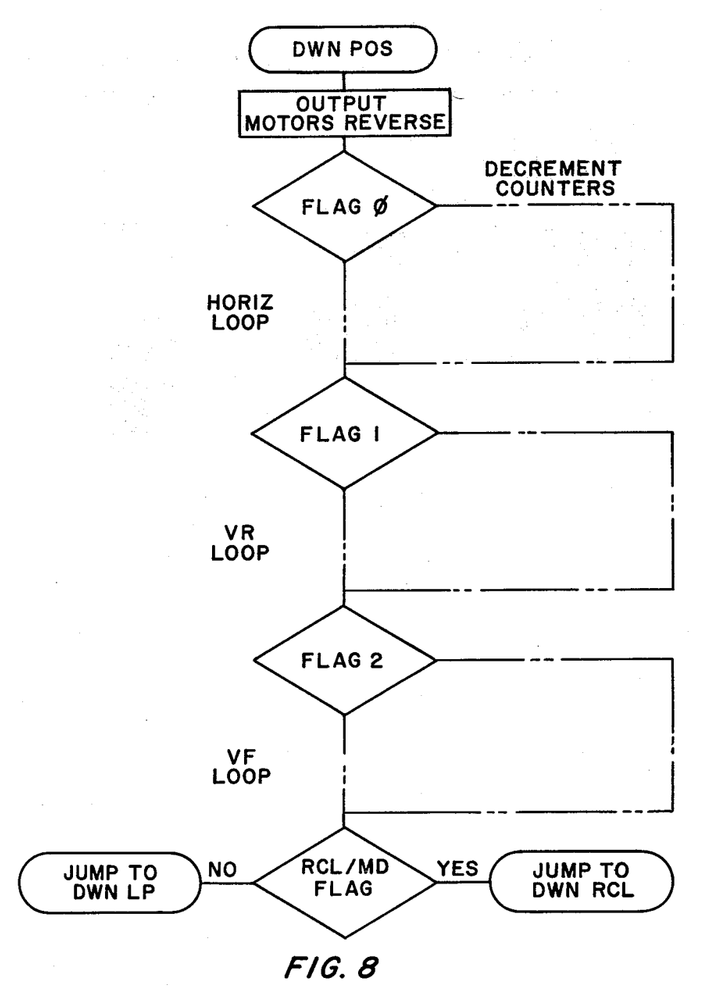
FIG. 8 is a flow chart of the down movement routine.

When the upward recall is completed, as determined by all count enable flags being reset due to reaching the destination for all forward movement or due to stall (assuming the recall switch remains activated), the flow then proceeds to the downward recall portion of the program. Downward recalling is accomplished in a manner similar to upward recalling with repetitive cycling through the DWNRCL routine (FIG. 6C) and the DWNPOS routine (FIG. 8). Again, at the end of the DWNRCL routine, checks are made for switch release and downward recall completion. In order to exit from the recall routine and return to the inactive mode, the switch must be released. When these conditions are met, the routine flow proceeds to the ALLOFF routine and then commences with the complete switch scan associated with the idle mode.

We claim:

1. A control apparatus for controlling the position of the seat of a powered seat mechanism for bidirectional travel in a fixed path of limited extent, said apparatus including a bidirectional motor operative to drive said mechanism in either of two directions, said motor having a predetermined number of poles, means for deriving control pulse signals from said motor based on the poles traversed during rotation of said motor for providing digital seat position data, memory and logic means for receiving said pulse signals and for storing data indicative of the position of the mechanism resulting from received pulses, manual selective position control means for said mechanism operative to operate said motor to set the position of said seat in a selected position by rotating said motor to traverse poles corresponding in number to said control signals, said memory and logic means including set position memory means for storing data indicative of the selected position, position recall means manually actuatable to signal the set position memory means to initiate operation of the motor, and means responsive to pulse signals from said logic and memory means for rotating said motor through a traverse of motor poles of the number necessary to move said mechanism to the selected position.

2. An electronic control apparatus for a multiple-adjustment seat positioning mechanism for a vehicle comprising: a reversible motor energizable to move the seat to a position in one adjustment mode, said motor operative to emit data in the form of a predetermined number of pulses during each revolution thereof, first storage means for storing pulse data representing the actual position of the seat in said one mode, means responsive to operation of the motor for providing position change data to said first storage means, first manual switch means for operating the motor directly to set the position of the seat in said one mode to a desired position, further storage means for storing data representing the set position of said seat in terms of pulse data, and further manual means operative to return the seat in said mode to the set position represented by data stored in said further storage means by rotation of the motor.

3. An electronic seat position control apparatus for adjusting the seat mechanism of a vehicle in which the adjustment is performed by a reversible motor, said motor on operation driving the seat mechanism in the forward or reverse direction in a respective travel path between opposed travel limits, said motor on rotation directly emitting control signals in digital form indicative of the number of rotations made by the motor, memory and logic means for receiving and storing said control signals to control the positioning of the seat mechanism, a plurality of manually operable control means, means responsive to operation of a position setting of one of said control means for operating the motor as long as said one control means remains operated to set a position of the seat mechanism for that mode, means for storing in said memory means a digital indication of the set position of the seat mechanism into which it has been set, and means to activate said logic and memory means to emit motor control signals to operate the motor a number of rotations to return the seat position to the position set by the condition setting control means.

* * * * *